(12) United States Patent
Huang et al.

(10) Patent No.: US 6,462,244 B1
(45) Date of Patent: Oct. 8, 2002

(54) HYDROGENATION CATALYSTS

(75) Inventors: Dinah C. Huang, Prospect; William M. Faris; P. Donald Hopkins, both of Louisville; Paul Jerus, Prospect, all of KY (US)

(73) Assignee: Sũd-Chemie Inc., Louisville, KY (US)

( * ) Notice: Subject to any disclaimer, the term of this patent is extended or adjusted under 35 U.S.C. 154(b) by 0 days.

(21) Appl. No.: 09/969,054

(22) Filed: Oct. 2, 2001

Related U.S. Application Data

(62) Division of application No. 09/362,408, filed on Jul. 28, 1999, now abandoned.

(51) Int. Cl.$^7$ .............................. C07C 5/10; C07C 5/03; C07C 13/465
(52) U.S. Cl. ................. 585/269; 585/260; 585/261; 585/266
(58) Field of Search ................... 585/266, 269, 585/260, 261, 273, 277; 502/327, 33.2, 339, 355, 333, 334, 415, 439; 208/144, 145; 501/153

(56) References Cited

U.S. PATENT DOCUMENTS

| | | | |
|---|---|---|---|
| 2,911,357 A | * 11/1959 | Myers et al. | 208/138 |
| 3,549,720 A | * 12/1970 | Wright et al. | 260/677 |
| 3,635,841 A | * 1/1972 | Keith et al. | 252/466 PT |
| 3,674,888 A | * 7/1972 | Derrien et al. | 260/681.5 |
| 3,759,823 A | * 9/1973 | Davies et al. | 208/138 |
| 3,869,521 A | * 3/1975 | Benson | 260/667 |
| 3,943,053 A | * 3/1976 | Kovach et al. | 208/143 |
| 3,979,278 A | * 9/1976 | Hayes | 208/143 |
| 4,049,576 A | * 9/1977 | Kovach et al. | 252/441 |
| 4,082,651 A | * 4/1978 | Antos | 208/139 |
| 4,098,683 A | * 7/1978 | Conway | 208/216 |
| 4,231,900 A | * 11/1980 | Kato | 252/466 PT |
| 4,251,392 A | * 2/1981 | Mauldin et al. | 252/439 |
| 5,057,206 A | * 10/1991 | Engel et al. | 208/143 |
| 5,068,025 A | * 11/1991 | Bhan | 208/57 |
| 5,286,898 A | * 2/1994 | Gustafson et al. | 560/127 |
| 5,972,820 A | * 10/1999 | Kharas et al. | 501/127 |

* cited by examiner

Primary Examiner—Stanley S. Silverman
Assistant Examiner—Cam N. Nguyen
(74) Attorney, Agent, or Firm—Scott R. Cox

(57) ABSTRACT

A hydrogenation catalyst which is sulfur tolerant and which includes from about 0.1 to about 1 percent platinum by weight and from 0.2 to about 2 percent by weight palladium on a predominantly theta alumina carrier. Also disclosed is a process for the manufacture and use of the hydrogenation catalyst.

14 Claims, No Drawings

HYDROGENATION CATALYSTS

RELATED APPLICATIONS

This is a divisional application of application Ser. No. 09/362,408, filed Jul. 28, 1999, abandoned.

BACKGROUND OF INVENTION

The field to which this invention pertains is hydrogenation catalysts, and more particularly, sulfur tolerant, aromatic hydrogenation catalysts and a process for their use.

DESCRIPTION OF THE RELATED ART

There is today a significant need in the petroleum industry for non-aromatic solvents, including liquid hydrocarbons which boil in the range of about 200 to 1100° F. Such products include, for example, aviation turbine fuel, diesel fuel, solvents, white oil, lube oil and the like. Products in this boiling range are conventionally produced by the hydrotreating and/or hydrocracking of various refinery feed streams, boiling in and above the desired product range. While hydrotreating and hydrocracking operations generally affect substantial partial hydrogenation of polynuclear aromatics, the resulting products still contain a relatively high percentage of monoaromatic hydrocarbons and a substantial amount of sulfur. Further hydrogenation of these products is desired in many cases to produce acceptable solvent products and to meet specifications for jet fuels and other such final products.

Other conventional hydrogenation applications include the hydrogenation of benzene to cyclohexane. One process for the production of cyclohexane comprises contacting a mixture of benzene, cyclohexane and hydrogen under hydrogenation conditions in the presence of a Group VI and Group VIII metal hydrogenation catalyst, such as is disclosed in U.S. Pat. No. 3,622,645. See also U.S. Pat. No. 3,869,521 which discloses a transition metal catalyst useful for the conversion of benzene to cyclohexane.

The hydrogenation of unsaturated hydrocarbons, particularly aromatic hydrocarbons, to corresponding saturated hydrocarbons using platinum and/or palladium catalysts is disclosed in U.S. Pat. No. 3,637,484. In this patent, platinum and/or palladium are deposited selectively by cationic exchange upon a silica/alumina co-gel or copolymer, which in turn is dispersed in a large pore alumina gel matrix.

U.S. Pat. No. 3,674,888 discloses a process for selectively hydrogenating unsaturated hydrocarbons in their liquid phase utilizing palladium on an alumina catalyst. The catalyst is the product resulting from contacting alumina agglomerates of a specific surface area with steam, admixing the agglomerate with a palladium compound and calcining the resulting mixture.

A significant problem that can occur with platinum and/or palladium catalysts is that they can be poisoned by sulfur compounds that may be present in the feed stream. A platinum and palladium catalyst for the selective hydrogenation of aromatics and olefins with some tolerance for sulfur and nitrogen is disclosed in U.S. Pat. Nos. 4,049,576 and 3,943,053. These patents teach a catalyst containing from 0.2 to 1 percent by weight of each of platinum and palladium impregnated on an inert carrier, preferably a high surface area, gamma alumina.

Another high surface area gamma alumina-based catalyst useful for the hydrogenation of unsaturated hydrocarbons is disclosed by U.S. Pat. No. 3,674,888. Other high surface area catalysts, preferably using a gamma alumina carrier, are disclosed in U.S. Pat. No. 4,713,363. See also U.S. Pat. No. 4,952,549.

In addition to alumina-based carriers, silica-alumina carriers onto which noble metals, such as platinum or palladium, are impregnated for the hydrogenation of petroleum feed streams are disclosed, for example, in U.S. Pat. No. 3,637,484. A catalyst with sulfur tolerance for the hydrogenation of aromatics, wherein the carrier comprises a surface-modified alumina/silica support, onto which noble metals have been impregnated, is disclosed in WO 98/35754. See also U.S. Pat. Nos. 3,461,181, 3,859,370 and 4,251,392.

Other catalyst containing palladium and/or platinum secured on inert alumina and/or silica carriers are disclosed in U.S. Pat. Nos. 2,911,357, 3,173,857, 3,271,327, 3,280,041, 3,549,720, 3,759,823 and 3,703,461, GB 1,501,346 and WO 98/35,754.

While some of these catalysts are useful for hydrogenating various unsaturated feed streams, there is still a need for improved hydrogenation catalysts.

In addition, prior art noble metal catalysts are still susceptible to poisoning from sulfur and/or nitrogen present in conventional feed streams. Thus, improved catalysts which have a tolerance for sulfur are also needed.

It is therefore an object of the invention to provide a novel hydrogenation catalyst.

It is another object of the invention to provide an improved hydrogenation catalyst for the conversion of aromatics in a feed stream, where the catalyst has high activity.

It is another object of the invention to provide an improved hydrogenation catalyst for the conversion of benzene to cyclohexane, where the catalyst has high activity and selectivity.

It is another object of the invention to provide an improved hydrogenation catalyst with a tolerance for low to medium levels of sulfur in a feed stream.

It is another object of the invention to provide an improved hydrogenation catalyst containing platinum and palladium on a transition alumina carrier.

It is another object of the invention to provide an improved hydrogenation catalyst for the removal of aromatics from a feed stream, where the catalyst comprises one or more noble metals, preferably platinum and palladium, placed on a predominantly theta alumina carrier.

These and other objects of the invention are obtained by the product and process of the present invention.

SUMMARY OF THE INVENTION

The invention is directed to an improved hydrogenation catalyst for the hydrogenation of aromatics and other unsaturated compounds in a hydrocarbon feed stream, which boils in the range from about 200 to about 1100° F., and which may contain up to about 150 ppmw of total sulfur. The catalyst of this invention includes from about 100 ppm to about 5 percent by weight of each of platinum and palladium, preferably from about 0.1 to about 1.0 percent platinum and from about 0.2 to about 2.0 percent palladium. The preferred molar ratio of platinum to palladium in the catalyst is from about 1 to 4 to about 1 to 7. The carrier for the catalyst is an inert alumina carrier, wherein the alumina preferably comprises at least about 50 percent theta (or delta) alumina, with the remaining portion of the carrier being preferably alpha alumina, preferably from about 1 to about 40 percent. Minor amounts of other transition aluminas may also be present.

The invention is also directed to a process for the hydrogenation of feed streams containing aromatic or other unsaturated hydrocarbons and less than about 150 ppmw of sulfur in contaminants by use of the above-described catalyst.

The invention is also directed to a process for the production of the above-referenced hydrogenation catalyst.

DETAILED DESCRIPTION OF THE INVENTION

The catalyst of the invention is preferably a bimetallic, Group VIII catalyst, wherein the Group VIII elements are preferably platinum and palladium, which are impregnated on an inert catalyst support or carrier. While other noble metals may be used for the catalyst, it has been discovered that superior hydrogenation catalysts are produced when platinum and palladium are utilized.

The catalyst support or carrier for the platinum and palladium is preferably a medium to low surface area alumina carrier, more preferably a predominantly theta (or delta) alumina carrier. Preferably the surface area of the carrier is from about 30 to about 150 m$^2$/g, more preferably 30–110 m$^2$/g, most preferably from about 60 to about 100 m$^2$/g. Theta (or delta) alumina comprises at least about 50 percent of the carrier, preferably at least about 60 percent. In order to maintain a relatively low surface area of less than about 150 m$^2$/g for the catalyst, up to about 40 percent of the carrier may also constitute an alpha alumina. Any combination of theta (or delta) alumina carrier and alpha alumina carrier which produces a carrier with a surface area within the preferred range is within the scope of the invention. Minor amounts of other transition aluminas may also be present in the carrier.

Various transition states of alumina are formed during thermal treatment of hydrated alumina. Their specific transition state is defined based on a number of considerations, including crystal structure, method of formation and surface area. At least seven transition forms of alumina are recognized, as discussed in Kirk-Othmer, *Encyclopedia of Chemical Technology,* Second Edition, Volume 2, pages 48–58 (1963). Three of these forms, chi, eta, and gamma, are poorly crystallized and three, kappa, delta and theta, are relatively well crystallized. A seventh form, rho alumina, may be considered amorphous. (Some authorities have asserted that rho alumina is also crystallized, but more poorly crystallized than gamma alumina.)

The specific surface area of the chi and eta forms of transition alumina are relatively high, ranging from 250 to 500 m$^2$/g with the specific surface area of gamma alumina ranging from 150–300 m$^2$/g. In contrast, the surface areas of kappa, theta and delta alumina are significantly lower with the surface area of delta and theta alumina generally in the range of about 60 to 100 m$^2$/g. The specific surface area of alpha alumina is lower still, generally less than about 30 m$^2$/g. Because of its relatively high surface area and ease of formation, gamma alumina has been frequently utilized as a carrier of choice for certain noble metal hydrogenation catalysts, such as those disclosed in U.S. Pat. Nos. 3,280,041, 4,049,576, 3,943,053 and 4,713,363.

Besides surface area, additional differences exist among the various forms of transition alumina as disclosed more completely on Table 3 of the article from Kirk Othmer which is referenced above. For example, the temperature needed to form the delta (and theta) forms of transition alumina is significantly higher (900–1000° C.) than that which is used to form the rho, eta and gamma forms of transition alumina (200-600° C.).

Because the specific surface area and crystal structure of theta and delta alumina are so similar, it is often difficult to distinguish between these two forms of alumina. Therefore, for purposes of this invention, all references to theta alumina also include delta alumina.

It has been surprisingly discovered that improved palladium and platinum catalysts for the hydrogenation of aromatic feed streams containing sulfur contaminants can be prepared from theta alumina carriers. This is surprising as the surface area of a carrier using theta alumina is significantly less than that of a conventional gamma alumina carrier used for the hydrogenation process as disclosed, for example, in U.S. Pat. No. 4,049,576.

Any reasonable method for depositing the platinum and the palladium on the referenced carrier can be used. In one preferred embodiment to impregnate the carrier with platinum and palladium, an aqueous solution, preferably consisting of chloroplatinic acid and palladium chloride, such as is supplied by Colonial Metals, is first prepared. The amount of chloroplatinic acid and palladium chloride dissolved in an aqueous solution is the amount sufficient to provide a final calcined catalyst containing from 100 ppm to about 5.0 percent by weight each of elemental platinum and palladium metals. Preferably, the platinum present in the catalyst comprises from about 0.1 to about 1.0 percent by weight and the palladium present in the catalyst comprises from about 0.2 to about 2.0 percent by weight. In a more preferred embodiment, the platinum comprises from about 0.1 to about 0.5 percent by weight and the palladium from about 0.2 to about 1.0 percent by weight of the catalyst. The preferred molar ratio of the platinum to the palladium in the catalyst is from about 1 to 3 to about 1 to 9, preferably from about 1 to 4 to about 1 to 7.

Because of the use of platinum and/or palladium chlorides in preparing the catalyst, the finished catalyst may also contain residual quantities of chlorides, from about 0.1 up to about 2 percent by weight. Surprisingly, the presence of chlorides in this range in the final catalyst may actually improve the overall performance of the catalyst.

To prepare the catalyst, the alumina carrier, which comprises predominantly theta alumina, is first prepared. To form the carrier a precursor material, such as boehmite powder, is first mixed with water and, if necessary, a suitable peptizing agent, such as an acid, to improve its mechanical strength. The carrier is then dried at low temperature to evaporate water and is then calcined at a temperature from about 1500 to about 2500° F. (816 to about 1371° C.) to form theta alumina. The composition of the alumina is confirmed by conventional characterization procedures, such as x-ray diffraction. The alumina carrier may include, in addition to theta alumina, various amounts of alpha alumina. Preferably, the theta alumina comprises at least about 50 percent of the carrier, more preferably, at least about 60 percent, with the remaining portion being alpha alumina, preferably from about 1 to about 40 percent, by weight. Minor amounts of other aluminas may also be present, such as gamma alumina, but in amounts less than about 5 percent. Heat treatment of the carrier reduces the surface area of the catalyst preferably to a range from about 30 to about 150 m$^2$/g, more preferably from about 50 to about 110 m$^2$/g, most preferably about 60 to about 100 m$^2$/g with a pore volume in the range of about 0.3 to about 0.7 cc/g. Any combination of theta alumina carrier and alpha alumina carrier which produces a carrier within the required surface area is within the scope of the invention.

The carrier can be formed in any conventional shape such as a powder, pellet, extrudate or sphere. Preferably, the carrier is formed into an extrudate of small size, preferably less than about 0.25 inch (0.6 cm.) in diameter.

Once the predominantly theta alumina carrier is formed, the platinum and palladium components are added. Any conventional process for impregnating a carrier with platinum and palladium is within the scope of the invention. In one embodiment, the carrier is impregnated with a solution of the chloroplatinic acid and palladium chloride. The amount of chloroplatinic acid and palladium chloride present in the solution depends on the level of palladium and platinum loadings desired on the predominantly theta alumina carrier. The wet catalyst is covered and left to absorb the materials for an extended period of time, preferably from about 2 to about 24 hours. The catalyst is then allowed to dry at ambient temperature for about 24 hours.

The catalyst may also be prepared by an incipient wetness process.

The dried catalyst is then calcined at a temperature up to about 500° C. (932° F.) for about 2 hours. At the conclusion of the calcining operation, the catalyst is ready for reduction. Reduction is accomplished by heating the catalyst composition in the presence of hydrogen at a temperature between about 500° F. (260° C.) and about 842° F. (450° C.) at a pressure of about 0 to about 2,000 psig for 3 hours. Alternatively, the catalyst may be reduced in situ by passing hydrogen gas at the above-referenced temperatures and under the above-referenced pressure.

It has been discovered that the catalyst prepared by the above-described process is "sulfur tolerant." "Sulfur tolerant" means that the catalyst will not substantially deactivate during the hydrogenation reaction with a certain level of sulfur present in the feed stream. This sulfur tolerance means that the hydrogenation catalyst of the invention is utilizable in conventional hydrogenation procedures wherein the feed streams contain modest levels of sulfur (less than about 150 ppm of total sulfur in the form of sulfur compounds) and remains active for a conventional length of time, i.e., the catalyst has a reasonable life cycle. The length of time that the catalyst of the invention retains good activity varies, depending on the specific feed stream utilized and other variables well recognized in the art. Notwithstanding, the catalyst of the invention is at least as, or more, sulfur tolerant as conventional sulfur tolerant hydrogenation catalysts used for the referenced hydrogenation process as where cracking and shift in boiling point are undesirable.

The catalyst of this invention preferably acts as a hydrogenation catalyst for the hydrogenation of unsaturated components in a liquid hydrocarbon stream. These feedstocks usually, or at least often, contain relatively high percentages of olefins and mononuclear and polynuclear aromatics which require further hydrogenation. The catalyst of this invention can also serve as a hydrogenation catalyst for aromatics, olefins and diolefins and for the hydrogenation of benzene to cyclohexane. The presence of sulfur compounds in many of these feedstocks often complicates the hydrogenation process by poisoning the metal catalyst used for hydrogenation. The catalyst of the present invention is tolerant of reasonable levels of sulfur or sulfur compounds in the feed stream, as discussed above.

It has been surprisingly discovered that a catalyst formed by the above-referenced process using predominantly theta (or delta) alumina catalyst perform better than conventional platinum and palladium catalyst deposited on a gamma alumina carrier as disclosed, for example, in U.S. Pat. No. 4,049,576.

EXAMPLES

The following examples describe the invention in more detail. Parts and percentages are by weight unless otherwise designated.

Example 1

A conventional alumina carrier in extrusion was formed by mixing boehmite powder with water and, if needed, by adding a peptizing agent to improve its mechanical strength. The carrier was extruded into a conventional shape with a diameter of about 1/20 in. The formed carrier was dried at a low temperature to evaporate water and then calcined with the temperature ramped to a final temperature of 1500 to 2500° F. (816 to about 1371° C.) and kept at the final temperature for 2–30 hours to produce a carrier comprised 96 percent theta alumina and 4 percent alpha alumina. Confirmation of the structure of the carrier was provided by x-ray diffraction. The carrier was then impregnated using an incipient wetness technique using a solution of hexachloroplatinic acid and palladium chloride of sufficient concentration to result in the platinum and palladium loadings referenced below. The catalyst carrier was left covered in the solution and allowed to soak for 18 to 24 hours. The catalyst was then uncovered and allowed to dry at ambient temperatures for about 24 hours. The dried catalyst was calcined in a furnace with the temperature raised in 10° C. increments and held for two hours at each of the following temperatures: 140° C., 300° C. and 500° C.

The catalyst contained 0.20 percent by weight platinum, 0.57 percent by weight palladium and 0.45 percent by weight chloride. The carrier for the catalyst had a surface area of 84 $m^2/g$ and a pore volume of 0.44 cc/g as shown in Table 1.

The performance of the catalyst was tested for hydrogenation of aromatics in a HCLGP/LGO light gas oil blend containing 25 weight percent total aromatics, 50 ppmw S, 2 ppmw N with the results shown in Table 1.

Example 2

The same procedure of Example 1 was followed except the steps of soaking and room temperature drying were omitted. The catalyst contained 0.19 percent platinum, 0.56 percent palladium, and 0.39 percent chloride by weight.

Comparative Example 3

The carrier used was a gamma alumina formed and calcined by conventional procedures. That the carrier was predominantly gamma alumina was confirmed by x-ray diffraction. The surface area of the carrier was 205 $m^2/g$ with a pore volume of 0.61 cc/g. The other procedures performed for preparing the catalyst were the same as in Example 1. The catalyst contained 0.21 percent platinum and 0.59 percent palladium.

Example 4

A larger pore carrier was prepared with the addition of a burn-out material which was calcined using the procedures of Example 1. It contained approximately 63 percent theta alumina and 37 percent alpha alumina. The impregnation and calcination procedures were the same as in Example 2. The catalyst contained 0.19 percent by weight platinum, 0.585 percent by weight palladium and 0.38 percent by weight chloride.

Comparative Example 5

A catalyst was produced according to the procedure disclosed in U.S. Pat. No. 4,049,576, Example 1. The carrier extrusion was a gamma alumina prepared as in Comparative Example 3. The concentration of the platinum and palladium on the carrier was 0.19 percent and 0.59 percent by weight respectively.

Catalyst Activation and Performance Tests 12.3 g by mass of each catalyst of each Example was loaded into a reactor, dried at 300° C. for two hours under a nitrogen flow. The reactor was pressurized with hydrogen to 550 psig pressure. The catalyst was thus reduced at 300° C. with hydrogen for 3 hours and cooled to 260° C. The reduced catalyst was tested for hydrogenation of aromatics in a light gas oil feed containing 25 weight percent total aromatic compounds, about 3.8 percent poly aromatics, 50 ppmw S and 2 ppmw N. The tests were run at 550 psig and 550° F., $H_2$/HC of 2000 scf/bbl and an LHSV of 1.2 l/l/hr.

The test results of these samples are summarized in Table 1. The catalyst with the highest aromatics conversion, i.e., the least amount of aromatics remaining in the product was the most active. As is proved by these examples, the catalyst of Examples 1, 2 and 4 using the predominantly theta alumina carrier were significantly more active than the gamma alumina carrier catalysts of Comparative Example 3 or Comparative Example 5 produced by the process disclosed in U.S. Pat. No. 4,049,576.

The principal preferred embodiments and modes of operation of the present invention have been described in the foregoing specification. The invention which is intended to be protected herein, however, is not to be construed as limited to the particular forms disclosed as these are to be regarded as illustrative rather than restrictive. In particular, the application of the catalyst of this invention is specifically not limited to the hydrogenation of aromatics in hydrocarbons. Variations and changes may be made by those skilled in the art without departing from the spirit of the invention.

2. The process of claim 1 wherein the sulfur comprises less than about 150 ppm by weight of the feed stream.

3. The process of claim 1 wherein the aromatic feed stream is predominantly benzene.

4. The process of claim 1 wherein the alumina carrier comprises from about 1 to about 40 percent by weight of an alpha alumina.

5. The process of claim 1 wherein the weight of platinum comprises from about 0.1 to about 1.0 percent by weight of the catalyst.

6. The process of claim 1 wherein the weight of palladium comprises from about 0.2 to about 2.0 percent by weight of the catalyst.

7. The process of claim 1 wherein the weight of platinum comprises from about 0.1 to about 1.0 percent by weight and the weight of palladium is from about 0.2 to about 2.0 percent by weight of the catalyst.

8. The process of claim 1 wherein the catalyst further comprises from about 0.1 to about 2 percent by weight of chloride.

9. The process of claim 1 wherein the molar ratio of the platinum to the palladium on a mole ratio basis in the catalyst is from about 1 to 3 to about 1 to 9.

10. The process of claim 1 wherein the molar ratio of the platinum to the palladium on a mole ratio basis in the catalyst is from about 1 to 4 to about 1 to 7.

11. The process of claim 1 wherein the catalyst is sulfur tolerant.

12. The process of claim 1 wherein the catalyst has a pore volume of from about 0.3 to about 0.7 cc/g.

13. A process for hydrogenation of a diolefin feed stream containing sulfur, comprising passing the feed stream over a

TABLE 1

| Example | Carrier | | Pore Volume, cc/g | Palladium | | Platinum | | % Total Aromatics Remaining in Product After Treatment |
|---|---|---|---|---|---|---|---|---|
| | Type | Surface Area, m²/g | | Source | % Pd on Catalyst | Source | % Pt on Catalyst | |
| 1 | 96% theta, 4% alpha alumina | 84 | 0.44 | palladium chloride | 0.57 | hexachloroplatinic acid | 0.20 | 0.3 |
| 2 | 96% theta 4% alpha alumina | 84 | 0.44 | palladium chloride | 0.56 | hexachloroplatinic acid | 0.19 | 0.2 |
| Comparative 3 | gamma alumina | 205 | 0.61 | palladium chloride | 0.59 | hexachloroplatinic acid | 0.21 | 1.4 |
| 4 | 63% theta, 37% alpha alumina | 85 | 0.56 | palladium chloride | 0.585 | hexachloroplatinic acid | 0.19 | <0.1 |
| Comparative 5 | gamma alumina | 205 | 0.61 | palladium chloride | 0.59 | hexachloroplatinic acid | 0.19 | 3.4 |

What is claimed is:

1. A process for hydrogenation of an aromatic feed stream containing sulfur comprising passing the aromatic feed stream over a hydrogenation catalyst comprising from about 100 ppm to about 5.0 percent by weight of each of platinum and palladium and an inert alumina carrier, wherein the alumina carrier comprises at least about 50 percent, by weight, of a theta or delta alumina wherein the surface area of the theta or delta alumina carrier is from 60 to about 100 m²/g.

hydrogenation catalyst comprising from about 100 ppm to about 5.0 percent by weight of each of platinum and palladium and an inert alumina carrier, wherein the alumina carrier comprises at least about 50 percent, by weight, of a theta or delta alumina wherein the surface area of the theta or delta alumina carrier is from 60 to about 100 m²/g.

14. The process of claim 13 wherein the alumina carrier comprises at least about 60 percent by weight of a theta or delta alumina.

* * * * *